H. B. ROBISCHUNG.
BRAKE HEAD.
APPLICATION FILED APR. 23, 1908.
906,162.
Patented Dec. 8, 1908.
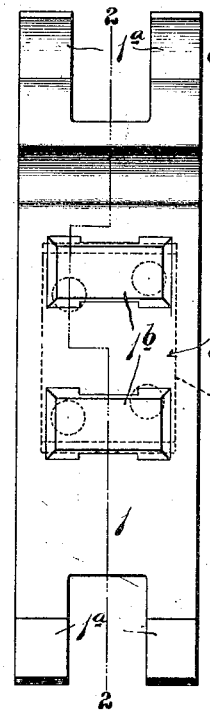
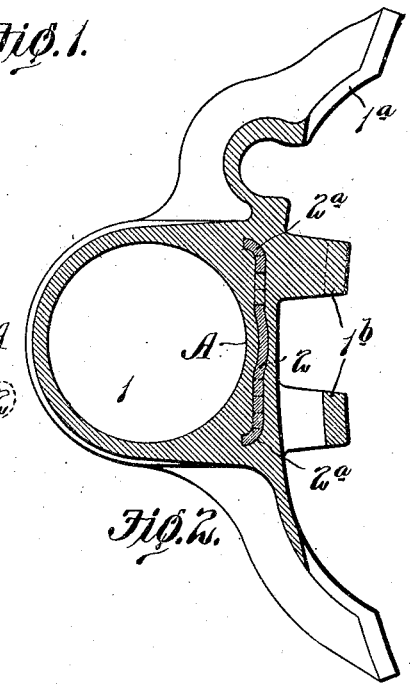
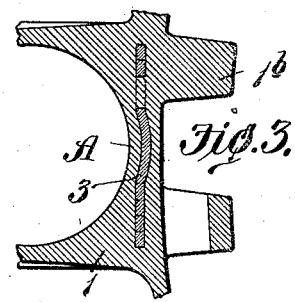
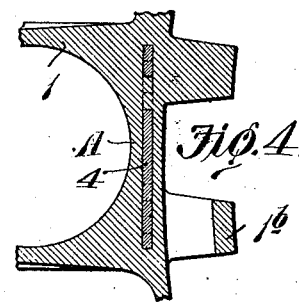
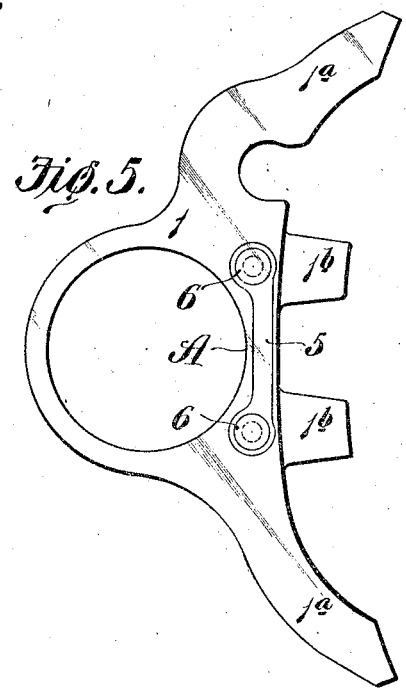
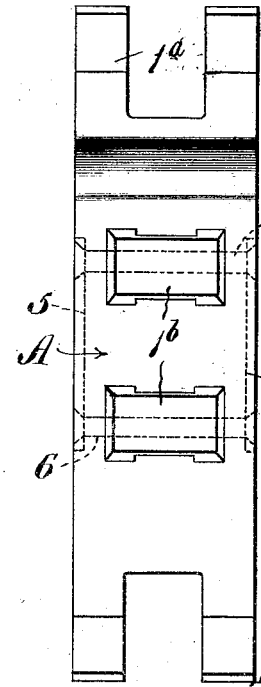
Witnesses:
Geo. R. Ladson
A. J. McCauley
Inventor,
Henry B. Robischung
By Bakewell Cornwall Attys.

UNITED STATES PATENT OFFICE.

HENRY B. ROBISCHUNG, OF CLOVERDALE, MICHIGAN, ASSIGNOR TO CHICAGO RAILWAY EQUIPMENT COMPANY, OF CHICAGO, ILLINOIS, A CORPORATION OF ILLINOIS.

BRAKE-HEAD.

No. 906,162.　　　Specification of Letters Patent.　　Patented Dec. 8, 1908.

Application filed April 23, 1908. Serial No. 428,727.

*To all whom it may concern:*

Be it known that I, HENRY B. ROBISCHUNG, a citizen of the United States, residing at Cloverdale, Barry county, Michigan, have invented a certain new and useful Improvement in Brake-Heads, of which the following is a full, clear, and exact description, such as will enable others skilled in the art to which it appertains to make and use the same, reference being had to the accompanying drawings, forming part of this specification, in which—

Figure 1 is a front elevational view of my improved brake head; Fig. 2 is a sectional view on the line 2—2 of Fig. 1; Figs. 3 and 4 are sectional views illustrating modified forms of embedded reinforcing plates; Fig. 5 is a side elevational view illustrating a modified form of exposed reinforcing plate; and Fig. 6 is a front elevational view of the structure illustrated in Fig. 5.

This invention relates to a new and useful improvement in brake heads, the object being to provide a brake head with a strengthening member or members across what might be termed the throat portion of the brake head located between the two jaws.

The brake head shown in the accompanying drawing is what is known as the "Christie" head, the jaws and lugs conforming to the templet requirements as prescribed by the Master Car-Builders' Association. Brake heads of this type in present use are usually made of malleable iron, and in practice it has been determined that either from improper mounting of the brake shoe in the head or improper setting of the brake head on the beam, the jaws of the brake head are subjected to unusual strains which has developed a weakness in that part of the brake head indicated at A, which I have designated as the throat or connecting portion between the jaws.

My invention consists in providing the brake head with a strengthening piece or pieces whose function is to reinforce the throat portion of the brake head so that said brake head can withstand heavy strains imposed upon its jaws.

In the drawings, 1 indicates a brake head having the usual jaws 1$^a$ and the usual lugs 1$^b$.

In the construction shown in Figs. 1 and 2, a reinforcing plate 2 is arranged in a mold before the brake head is cast, said plate being provided with appropriate openings for the passage of the molten metal therethrough, and having its end bent as at 2$^a$ for the purpose of better securing the plate in position. Plate 2 is preferably centrally embedded in the throat portion of the finished brake head as shown, and may be made of steel or any other metal capable of withstanding the tension strains to which it is subjected.

In Fig. 3 the reinforcing plate marked 3 is similar to that shown in Fig. 2, except that its edges are straight.

In Fig. 4 the reinforcing plate 4 is not provided with concavo-convex middle portion but is flat.

In Figs. 5 and 6, instead of embedding the reinforcing plate in the metal of the head I recess the side faces of the head and introduce links 5 which are secured in position by suitable fastening devices 6. Of course, it will be understood that the strengthening members 5 and the fastening device 6 may be arranged in the mold and the metal of the brake head cast therearound.

I am aware that minor changes in the construction, arrangement and combination of the several parts of my device can be made and substituted for those herein shown and described without in the least departing from the nature and principle of my invention.

Having thus described the invention, what is claimed as new and desired to be secured by Letters Patent is:

1. A brake head having a reinforcing member bridging its throat portion; substantially as described.

2. A brake head having a reinforcing member bridging its throat portion and having its ends anchored or secured in position on each side of said throat portion; substantially as described.

3. A brake head having a strengthening plate embedded in its throat portion; substantially as described.

4. A brake head having a perforated strengthening plate embedded in its throat portion; substantially as described.

5. A brake head having a concavo-convex strengthening plate embedded in its throat portion; substantially as described.

6. A brake head having a strengthening plate embedded in its throat portion, the ends of said strengthening plate being provided with means forming an anchorage; substantially as described.

7. A brake head having a plurality of strengthening plates bridging its throat portion; substantially as described.

8. A brake head having a reinforcing member bridging its throat portion and having its ends anchored or secured in position on each side of said throat portion, said reinforcing member being exposed to the exterior; substantially as described.

9. A brake head having strengthening plates arranged in the side faces, said strengthening plates being held in position by suitable fastening devices; substantially as described.

10. A brake head having strengthening plates set in its side faces and flush with the planes of said side faces, said strengthening plates being secured in position by suitable fastening devices; substantially as described.

In testimony whereof I hereunto affix my signature in the presence of two witnesses, this fifth day of July 1907.

HENRY B. ROBISCHUNG.

Witnesses:
HUGH D. CAMPBELL,
J. O. CHAMBERLAIN.